(12) United States Patent
Björnemo

(10) Patent No.: US 10,215,871 B2
(45) Date of Patent: *Feb. 26, 2019

(54) METHOD AND SYSTEM OF SUPPRESSING DATA CORRESPONDING TO NOISE USING A MODEL OF NOISE PROPAGATION ALONG A SENSOR STREAMER

(71) Applicant: PGS Geophysical AS, Oslo (NO)

(72) Inventor: Lars Erik Magnus Björnemo, Kista (SE)

(73) Assignee: PGS Geophysical AS, Oslo (NO)

( * ) Notice: Subject to any disclaimer, the term of this patent is extended or adjusted under 35 U.S.C. 154(b) by 203 days.

This patent is subject to a terminal disclaimer.

(21) Appl. No.: 15/164,299

(22) Filed: May 25, 2016

(65) Prior Publication Data

US 2017/0059731 A1 Mar. 2, 2017

Related U.S. Application Data

(60) Provisional application No. 62/212,782, filed on Sep. 1, 2015, provisional application No. 62/212,688, filed on Sep. 1, 2015.

(51) Int. Cl.

| G01V 1/36 | (2006.01) |
| G01V 1/38 | (2006.01) |
| G01V 1/28 | (2006.01) |
| G01V 1/20 | (2006.01) |

(52) U.S. Cl.
CPC ............ *G01V 1/364* (2013.01); *G01V 1/282* (2013.01); *G01V 1/38* (2013.01); *G01V 1/201* (2013.01); *G01V 1/3808* (2013.01); *G01V 2210/324* (2013.01); *G01V 2210/44* (2013.01); *G01V 2210/56* (2013.01)

(58) Field of Classification Search
CPC .......... G01V 1/364; G01V 1/38; G01V 1/282; G01V 2210/56; G01V 2210/324; G01V 1/201; G01V 1/3808; G01V 2210/44
USPC .......................................... 367/21
See application file for complete search history.

(56) References Cited

U.S. PATENT DOCUMENTS

| 3,319,734 A | 5/1967 | Pavey, Jr. |
| 7,426,438 B1* | 9/2008 | Robertsson ............ G06Q 30/06 702/14 |
| 7,426,439 B2* | 9/2008 | Ozdemir ............... G01V 1/3808 175/1 |
| 7,881,159 B2 | 2/2011 | Hegna et al. |
| 8,923,091 B2 | 12/2014 | Lambert |
| 9,482,783 B2 | 11/2016 | Aaker et al. |
| 9,796,455 B2 | 10/2017 | Larsen |

(Continued)

FOREIGN PATENT DOCUMENTS

| GB | 2162638 A | 2/1986 |
| WO | 2014152900 A2 | 9/2014 |

*Primary Examiner* — Daniel L Murphy

(57) ABSTRACT

Suppressing data corresponding to noise using a model of noise propagation along a sensor streamer. At least some of the example embodiments are methods including: reading a data set containing noise and seismic signals recorded by geophones disposed in a sensor streamer when the sensor streamer was within a body of water; determining locations of noise sources along the sensor streamer when the sensor streamer was within the body of water; and suppressing data of the data set corresponding to noise sources along the sensor streamer.

17 Claims, 10 Drawing Sheets

(56) References Cited

U.S. PATENT DOCUMENTS

| | | |
|---|---|---|
| 9,841,519 B2 | 12/2017 | Rouquette |
| 9,864,084 B2 * | 1/2018 | Poole ........................ G01V 1/36 |
| 2005/0095351 A1 | 5/2005 | Zumeris et al. |
| 2006/0002234 A1 | 1/2006 | Lobe et al. |
| 2009/0316526 A1 | 12/2009 | Grall |
| 2010/0020644 A1 | 1/2010 | Vignaux |
| 2014/0286127 A1 | 9/2014 | Goujon et al. |
| 2014/0288841 A1 | 9/2014 | Ozdemir et al. |
| 2014/0365135 A1 | 12/2014 | Poole |
| 2014/0376329 A1 | 12/2014 | Aaker et al. |
| 2015/0234064 A1 | 8/2015 | Wallace et al. |
| 2016/0018545 A1 | 1/2016 | Rouquette |
| 2017/0059731 A1 | 3/2017 | Bjornemo |
| 2017/0059732 A1 * | 3/2017 | Bjornemo .............. G01V 1/364 |
| 2018/0059278 A1 | 3/2018 | Rouquette |

* cited by examiner

METHOD AND SYSTEM OF SUPPRESSING DATA CORRESPONDING TO NOISE USING A MODEL OF NOISE PROPAGATION ALONG A SENSOR STREAMER

CROSS-REFERENCE TO RELATED APPLICATIONS

This application claims the benefit of U.S. Provisional Application Ser. No. 62/212,782 filed Sep. 1, 2015 titled "Suppression of Velocity Noise Using a Noise Propagation Model for Cable Vibrations." This application also claims the benefit of U.S. Provisional Application Ser. No. 62/212,688 filed Sep. 1, 2015 titled "Vibration Analysis to Identify Cable Propagation Modes and Models." Both provisional applications are incorporated by reference herein as if reproduced in full below.

BACKGROUND

In marine geophysical surveying, one or more sensor streamers are towed behind a tow vessel, and the sensor streamers collect data (e.g., seismic, electromagnetic) regarding underground formations. Sensor streamers used for seismic surveys may contain sensors that are sensitive to particle motion caused by seismic signals propagating past the sensor streamers. The sensors sensitive to motion are also sensitive to noise propagating along the sensor streamer in the form of transverse vibrations, such as noise caused by water flow by and around barnacles and other marine growth as the sensor streamers are towed through the water. Other noise sources are also possible, such as depth control devices and debris tangled with the sensor streamers.

Regardless of the precise nature of the noise sources, the noise created by such noise sources interferes with collection of seismic data, such as by masking seismic signals of interest. Moreover, while all noise propagates along the sensor streamer to some degree, low frequency noise is attenuated less by the sensor streamer and thus low frequency noise propagates further along the streamer. Low frequency noise may therefore mask seismic signals of interest recorded by sensors located along the streamer far from the noise source location.

BRIEF DESCRIPTION OF THE DRAWINGS

For a detailed description of exemplary embodiments, reference will now be made to the accompanying drawings in which.

DEFINITIONS

Figure 1:
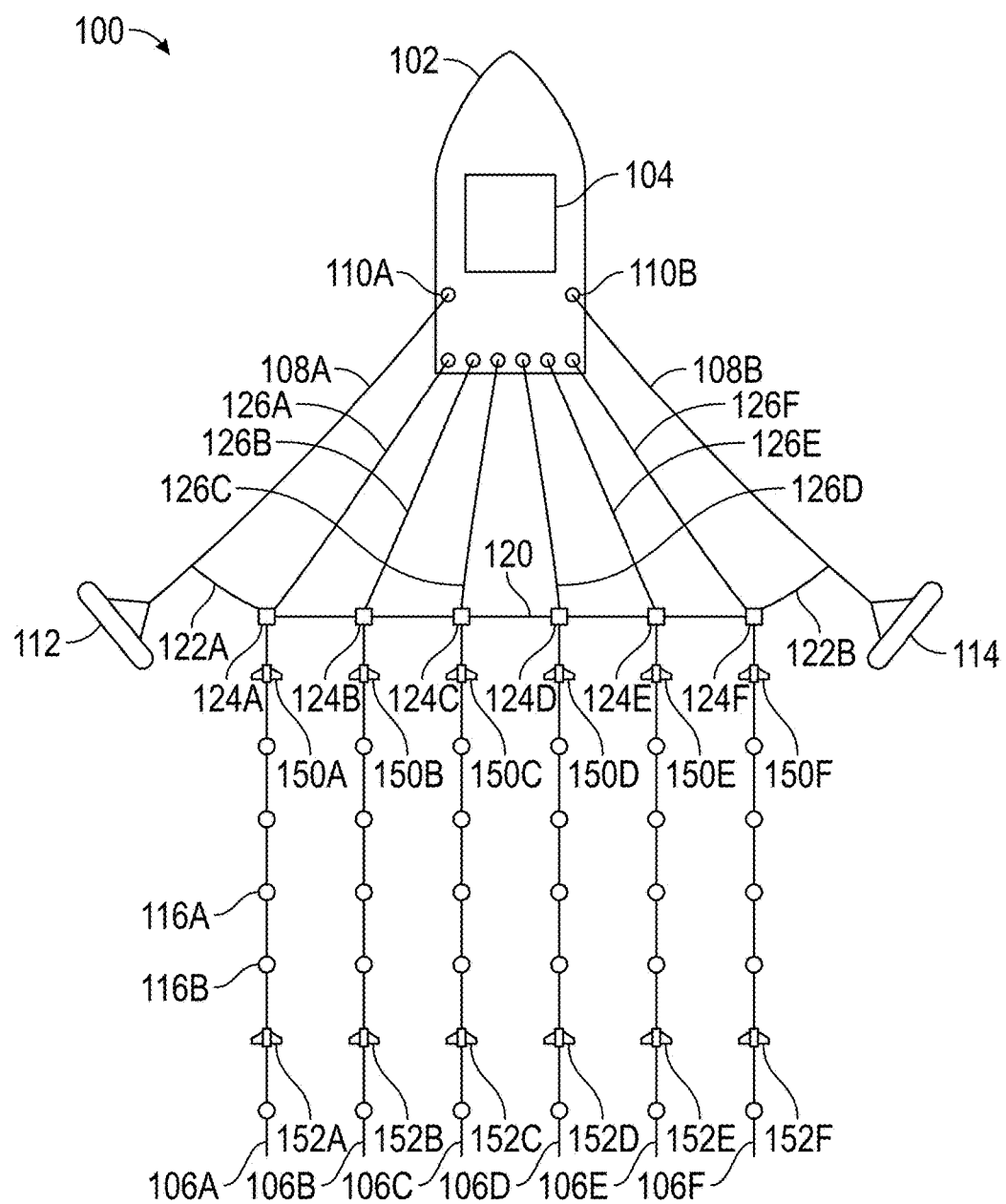
FIG. 1 shows an overhead view of a marine geophysical survey in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Geophone" shall mean any sensor sensitive to motion, such as velocity sensors, and acceleration sensors (i.e., accelerometers). A pressure sensor shall not be considered a sensor sensitive to motion.

"Signal cone" shall mean a subset of data within a larger data set, where the subset of data represents noise and/or signals having propagation speeds equal to or above the speed of sound in water. The propagation speeds may be actual or apparent (e.g., caused by aliasing).

"De-propagating," in relation to determining locations of noise sources, shall mean using a mathematical inverse of a model of noise propagation and a data set to determine locations of noise sources.

"Seismic signals" shall mean energy corresponding to a shot and reflected from an underground formation.

"Shot" shall mean the creation and/or release of acoustic energy as part of a geophysical survey.

"Voice coil" shall mean a device that moves a plunger relative to a solenoid, the plunger at least partially disposed within magnetic flux paths created by the solenoid when energized. The term voice coil includes audio speakers.

"Known vibrations" shall mean vibrations traveling along a sensor streamer where the origin location is known in advance of creation of the vibrations. Other information regarding the known vibrations may also be known in advance, such as spectral content and amplitude.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Various embodiments are directed to reducing noise in a data set created during a marine geophysical survey utilizing geophones in the sensor streamers. More particularly, various embodiments are directed to determining locations of noise sources along a sensor streamer when the sensor streamer was within a body of water, and suppressing noise from the data set corresponding to noise not only at the locations of the noise sources, but also noise propagated away from the locations of the noise sources along the sensor streamer. In example embodiments, the suppressing of the noise is based on a model of noise propagation along the sensor streamer. In yet still other example embodiments, the model of noise propagation along the sensor streamer is created and/or modified based on known vibrations injected onto the sensor streamer, such as by a controlled source of vibrations. The specification first turns to an example marine geophysical survey to orient the reader.

FIG. 1 shows an overhead view of a marine geophysical survey system 100 in accordance with at least some embodiments. In particular, FIG. 1 shows a survey vessel 102 having onboard equipment 104, such as navigation, energy source control, and data recording equipment. Survey vessel 102 is configured to tow one or more sensor streamers 106A-F through the water. While FIG. 1 illustratively shows six sensor streamers 106, any number of sensor streamers 106 may be used.

The sensor streamers 106 are coupled to towing equipment that maintains the sensor streamers 106 at selected lateral positions with respect to each other and with respect to the survey vessel 102. The towing equipment may comprise two paravane tow lines 108A and 108B each coupled to the survey vessel 102 by way of winches 110A and 1106, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle." The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader lines 120 or as illustrated couple to the spreader line by way of spur lines 122A and 122B.

The sensor streamers 106 are each coupled, at the ends nearest the survey vessel 102 (i.e., the proximal ends) to a respective lead-in cable termination 124A-F. The lead-in cable terminations 124 are coupled to or are associated with the spreader lines 120 so as to control the lateral positions of the sensor streamers 106 with respect to each other and with respect to the survey vessel 102. Electrical and/or optical connections between the appropriate components in the onboard equipment 104 and the sensors (e.g., 116A, 116B) in the sensor streamers 106 may be made using lead-in cables 126A-F. Much like the paravane tow lines 108 associated with respective winches 110, each of the lead-in cables 126 may be deployed by a respective winch or similar spooling device such that the deployed length of each lead-in cable 126 can be changed.

Still referring to FIG. 1, in many cases the sensor streamers 106 will be associated with a plurality of streamer positioning devices. For example, the sensor streamers 106A-F may be associated with streamer positioning devices 150A-F, respectively, shown coupled on the proximal ends of the sensor streamers. In many cases, the streamer positioning devices 150A-F may provide only depth control, as the lateral spacing of the sensor streamers near the proximal ends may be adequately controlled by the spreader lines 120, and twisting (i.e., rotation about the long axis of the sensor streamer) may not be an issue close to the lead-in cable terminations 124A-F. Further, the sensor streamers 106A-F may be associated with streamer positioning devices 152A-F, respectively, shown coupled further from the proximal ends, and in some cases near the distal ends of the sensor streamers 106A-F. The streamer positioning devices 152A-F may provide not only depth control, but also lateral positional control and may assist in preventing twisting experienced by the sensor streamers. The streamer positioning devices may be EBIRD® wings available from Kongsberg Maritime AS, Kongsberg, Norway. In some cases each sensor streamer 106 may be 1000 to 10000 meters in length, and may comprise 20 or more streamer positioning devices.

Figure 2:
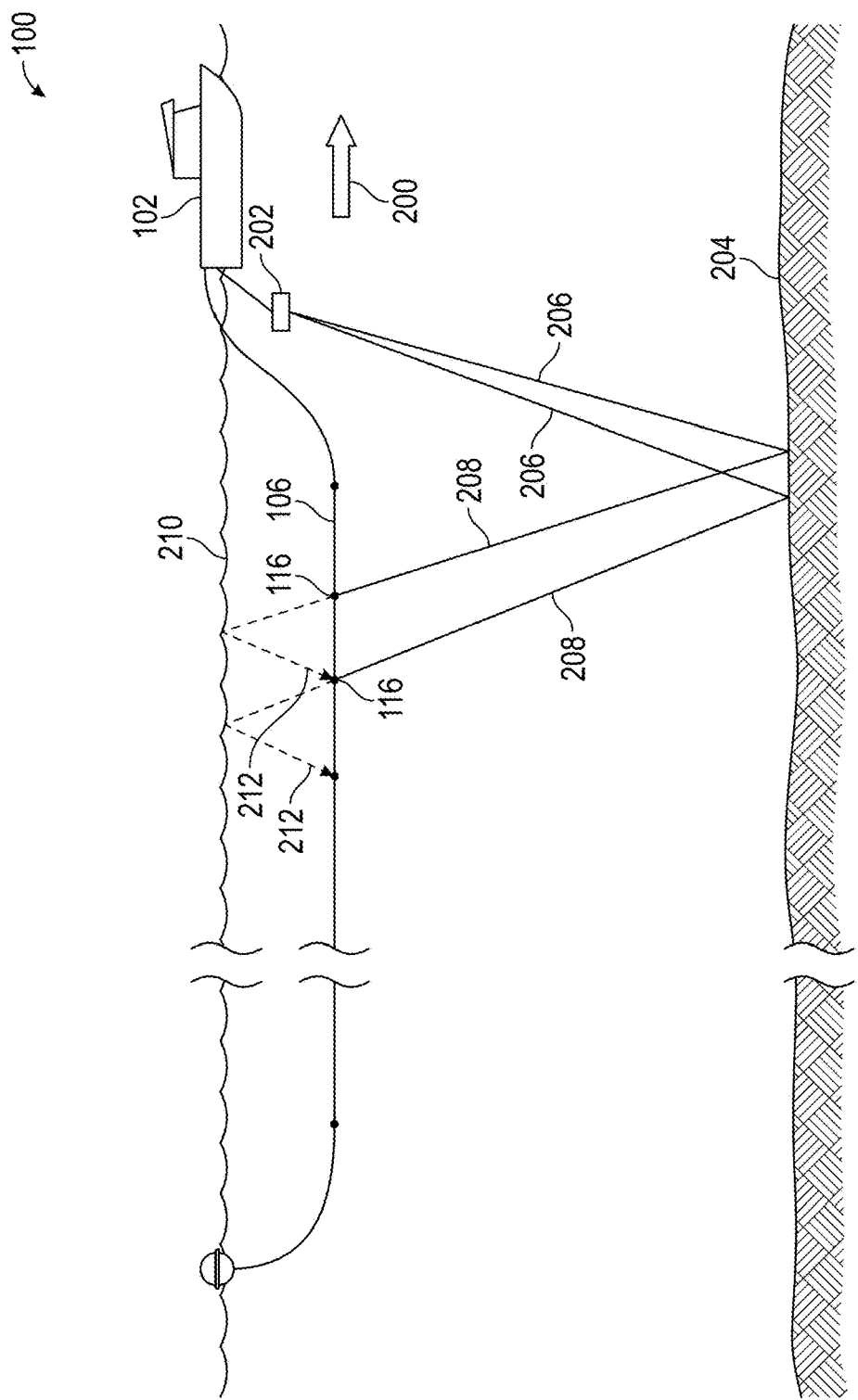
FIG. 2 shows a side elevation view of a marine geophysical survey in accordance with at least some embodiments.

FIG. 2 shows a side elevation view of the marine geophysical survey system 100 in order to discuss surface ghost effects. In particular, FIG. 2 shows survey vessel 102 towing a sensor streamer 106 in a tow direction 200. In the view of FIG. 2, only one sensor streamer 106 is visible. The survey vessel 102 in the example marine geophysical survey system 100 also tows a seismic source 202 (e.g., air gun(s) or marine vibrator(s)) which periodically and selectively releases seismic energy, some of which propagates toward the seafloor 204. The seismic source 202 creates seismic waves defining propagating wave fronts, but so as not to unduly complicate the figure only a few example directions of travel of the wave fronts are shown by lines 206 (but still referred to as seismic waves 206). Down-going seismic waves 206 may be reflected off the seafloor 204 (and/or subsurface structures below the seafloor) and thus move in an upward direction as up-going seismic waves 208 which intersect the sensor streamer 106 at various sensor 116 locations and thereby create seismic signals. These incident up-going seismic waves 208 then continue upward past the sensor streamer 106 and are reflected off the surface 210 of the water as down-going "surface ghost" waves 212. These "surface ghost" waves intersect the streamer again at various sensor locations. For simplicity of illustration, only two paths are depicted in FIG. 2, while an actual seismic source would define many paths originated at the seismic source 202, reflected off the seafloor and subsurface structures, and reflected as surface ghost waves off the waters' surface 210.

In various embodiments, the sensors 116 at each location include a hydrophone, which is a device that is sensitive to pressure changes. Thus, as the up-going seismic waves 208 interact with the sensor streamer 106, the hydrophones measure pressure changes associated with the up-going seismic waves 208. However, and as mentioned above, the up-going seismic waves 208 continue past the sensor streamer 106 to the surface 210 and are reflected as surface ghost waves 212. The reflection at the surface 210 results in a 180 degree phase change (or, equivalent stated, the reflection results in a sign reversal) such that as the surface ghost waves 212 again interact with the sensor streamer 106 cancelling other up-going seismic waves. Stated otherwise, the surface ghost waves cause destructive interference with up-going seismic waves at the hydrophones, resulting in spectral notches.

To address this issue, the sensors 116 may also include collocated sensors that are sensitive to particle motion (e.g., velocity sensors (with single direction or multi-direction sensitivity), or acceleration sensors (with single direction or multi-direction sensitivity)). The particle motion sensors are also known as geophones. The specification discusses the mathematical aspects of the separation in greater detail below. Suffice it to say that the addition of a collocated geophone with a hydrophone at each "sensor" 116 location provides better overall data after processing.

However, geophones are susceptible to noise in the form of transverse mechanical vibrations propagating along the sensor streamer. Noise propagation is a function of many variables. For example, propagation velocity of transverse mechanical noise may be a function of tension in the sensor streamer, such that locations along the sensor streamer where tension is higher (e.g., at the proximal ends of the sensor streamers) have higher propagation velocity of transverse mechanical noise than locations where tension is lower (e.g., distal ends of the sensor streamers). Moreover, lower frequency noise (e.g., below about 50 Hertz (Hz)) tends to propagate further along the sensor streamer than higher frequency noise (e.g., above about 50 Hz). Equivalently stated in terms of attenuation, higher frequency noise is attenuated more per unit distance than lower frequency noise.

Noise sources along a sensor streamer may take many forms. Consider first a perfectly clean (i.e., no marine growth) sensor streamer deployed and towed through the water. The perfectly clean sensor streamer may have many noise sources. For example, streamer positioning devices 150 and 152 may introduce broadband noise onto the sensor streamer. Further, debris (e.g., fishing line, trash) may tangle with a sensor streamer, and the debris may induce vibrations onto the sensor streamer as the sensor streamer is towed through the water. Moreover, most devices in marine environments, including sensor streamers, become host locations for marine growth (e.g., barnacles, mussels). The barnacles and mussels may have sufficient structure that, as the sensor streamer is towed through the water, vortex shedding of water around the barnacles and mussels causes vibratory motion that is picked up as noise by the geophones. Other noise sources are also possible. The specification now turns to a more mathematical discussion of separating the up-going seismic waves as well as various embodiments for identifying and algorithmically removing the noise of various noise sources such as those discussed above.

The following discussion assumes a single streamer (e.g., one sensor streamer towed behind the survey vessel) where each "sensor" comprises a collocated geophone measuring vertical velocity response $V_z$ (e.g., a gimballed geophone) and a hydrophone measuring total pressure P, where both the geophone and hydrophone respond perfectly to velocity and pressure, respectively. Considering a single location then, the up-going pressure field can be derived as follows:

$$P_{up}(\omega, k_\chi) = \frac{1}{2}[P(\omega, k_\chi) - \alpha(\omega, k_\chi, \rho, c) V_z(\omega, k_\chi)] \quad (1)$$

where $P_{up}$ is the de-ghosted up-going pressure field, $\omega$ is the angular frequency, $k_\chi$ is the spatial wavenumber, P is the measured pressure response of the hydrophone, $\rho$ is the density of the water, c is the propagation velocity of sound in the water, and $V_z$ is the measured vertical velocity response of the geophone. In words, the $P_{up}$ data is a combination of the pressure response P of the hydrophone less a portion of the sensed vertical component of the particle velocity. Likewise the down-going pressure field can be derived as follows:

$$P_{down}(\omega, k_\chi) = \frac{1}{2}[P(\omega, k_\chi) + \alpha(\omega, k_\chi, \rho, c) V_z(\omega, k_\chi)] \quad (2)$$

where $P_{down}$ is the down-going pressure field. Again in words, the $P_{down}$ data is a combination of the pressure response P of the hydrophone plus a portion of the sensed vertical component of the particle velocity. The $\alpha$ term in both equations is a scale factor expressed as:

$$\alpha(\omega, k_\chi, \rho, c) = \frac{\omega \rho}{\sqrt{\left(\frac{\omega}{c}\right)^2 - k_\chi^2}} = \frac{\rho c}{\cos(\theta)} \quad (3)$$

where $\theta$ is the emergence angle. The $P_{up}$ data (equation (1)) may be the de-ghosted deliverable for marine geophysical surveys that have a seismic component.

Conceptually, the data recorded by each hydrophone and geophone have both signal and noise components. The presence of both signal and noise can be expressed mathematically as follows:

$$d_P(\omega, k_\chi) = P(\omega, k_\chi) + \varepsilon(\omega, k_\chi) \quad (4)$$

$$d_V(\omega, k_\chi) = V_z(\omega, k_\chi) + \upsilon(\omega, k_\chi) \quad (5)$$

where $d_P$ is the pressure data, and $\varepsilon$ is the noise in the pressure data (hereafter just "pressure noise"), $d_V$ is the velocity data, and $\upsilon$ is the noise in the velocity data (hereafter just "velocity noise"). Plugging equation (4) into equation (1) and mathematical manipulation results in an estimated $P_{up}$ as follows:

$$P_{up}^{est}(\omega, k_\chi) = P_{up}(\omega, k_\chi) + \frac{1}{2}[\varepsilon(\omega, k_\chi) - \alpha(\omega, k_\chi, \rho, c) \upsilon(\omega, k_\chi)] \quad (6)$$

where $P_{up}^{est}$ is the estimated $P_{up}$ data. In words, the $P_{up}^{est}$ is the up-going pressure field plus a noise component involving both the pressure noise and velocity noise. By mathematical manipulation of equation (6) it follows that total noise in the up-going pressure field is therefore:

$$\xi_0(\omega, k_\chi) \equiv P_{up}^{est}(\omega, k_\chi) - P_{up}(\omega, k_\chi) \quad (7)$$

$$\xi_0(\omega, k_\chi) = 1/2[\varepsilon(\omega, k_\chi) - \alpha(\omega, k_\chi, \rho, c) \upsilon(\omega, k_\chi)] \quad (8)$$

where $\xi_0$ is the total noise. Equation (8) shows that both the pressure noise $\varepsilon(\omega, k_\chi)$ and the velocity noise $\upsilon(\omega, k_\chi)$ contribute the total noise $\xi_0$ in the up-going pressure field.

At least some of the example embodiments are directed to suppressing the velocity noise $\upsilon(\omega, k_\chi)$ in equation (8) above. More particularly, various embodiments are directed to determining locations of noise sources along a sensor streamer when the sensor streamer was within a body of water by de-propagating the noise using a model of noise propagation along the sensor streamer, and suppressing data corresponding to noise sources along the sensor streamer. The de-propagation and suppressing may create a down-sampled data set.

Consider, for purposes of explanation, a data set containing the received data from geophones along a single streamer during a collection period of a seismic survey (e.g., 14 seconds of time after a shot). Each geophone records data comprising seismic signals passing the sensor streamer, as well as noise. The seismic signals of interest may span several tens of Hertz or more. The noise too may span many tens of Hertz, but the upper end of the noise frequency may be higher than the upper end of the seismic signal frequency.

Thus, a single geophone may record a range of signals having a range of frequencies.

Figure 3:
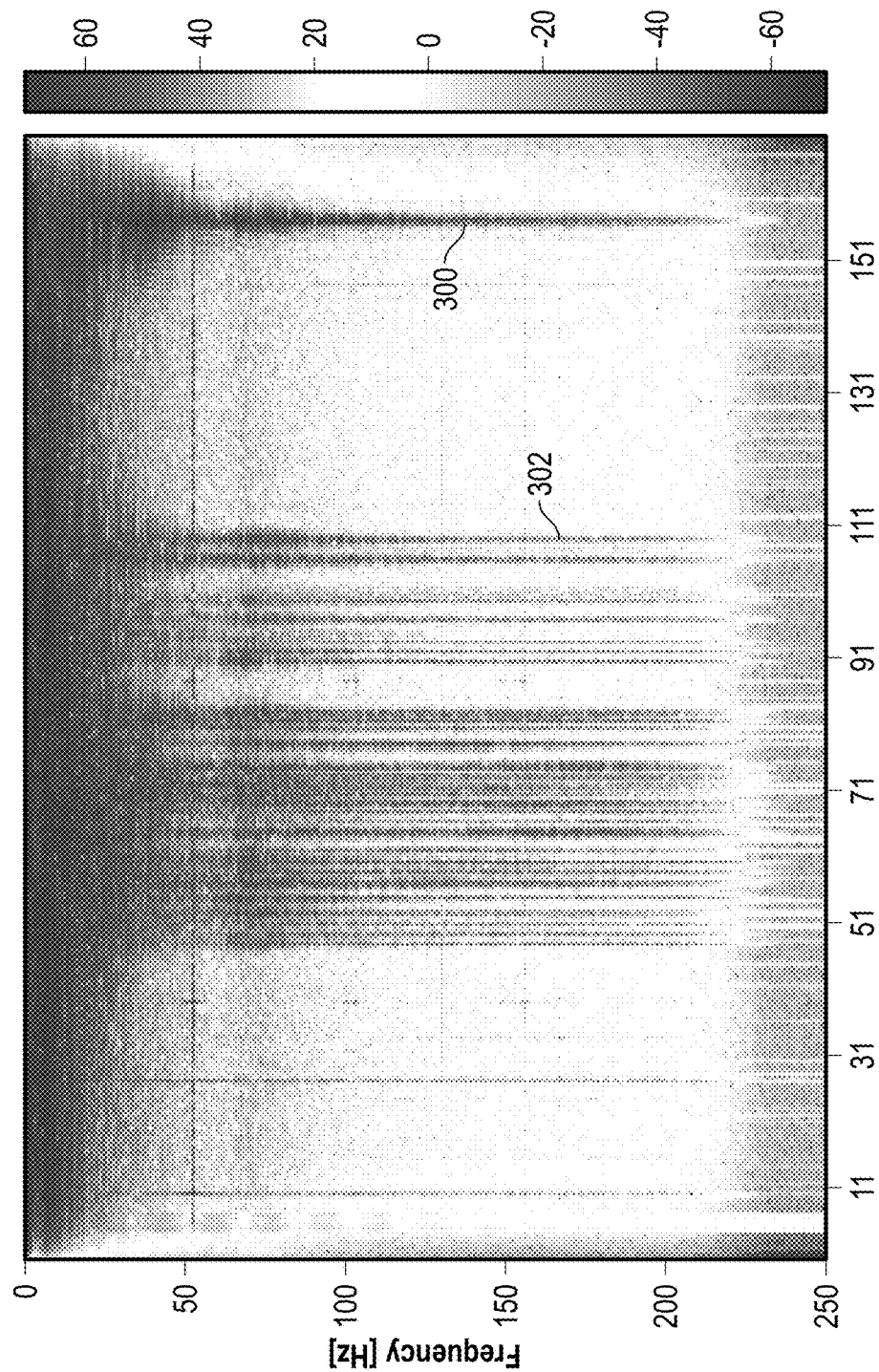
FIG. 3 shows a frequency-position plot in accordance with at least some embodiments.

FIG. 3 shows a frequency-position plot of an example data set acquired by geophones of a single streamer during a collection period. The vertical axis shows frequency of received signals, and the horizontal axis identifies geophones along the sensor streamer by inline position (e.g., the sensor at inline position 11 being closer to the survey vessel than the sensor at position 151). Thus, each entry on the horizontal axis refers to a single geophone along the sensor streamer. The intensity of the information within the plot shows the magnitude of the data represented at the frequency and position. The example plot of FIG. 3 again represents data collected over a collection period (e.g., 14 seconds of collection), but time is not expressly represented in the plot.

The plot of FIG. 3 visually conveys much information about the state of the sensor streamer during data collection. For example, the sensor streamer had several noise sources spaced about the sensor streamer during data collection, the noise sources represented by downward "spikes" of broadband data. In the example data set, spike 300 is representative of a streamer positioning device and the noise induced on the sensor streamer by the streamer positioning device. The downward spike 302 and the plurality of spikes to the left of spike 302 represent a group of broadband noise sources spaced along the sensor streamer during data collection. FIG. 3 also shows that low frequency noise experiences less attenuation per unit distance travelled than high frequency noise. In particular, the higher frequency portions (e.g., above 100 Hz, and including spikes 300 and 302) have smaller breadth in the horizontal direction (showing that the higher frequency noise is attenuated faster and thus propagates shorter distances along the sensor streamer). Oppositely, the lower frequency portions (e.g., below 100 Hz, and particularly below 50 Hz) tend to have larger breadth in the horizontal direction (showing that the lower frequency noise is less attenuated and thus propagates longer distances along the sensor streamer).

Figure 4:
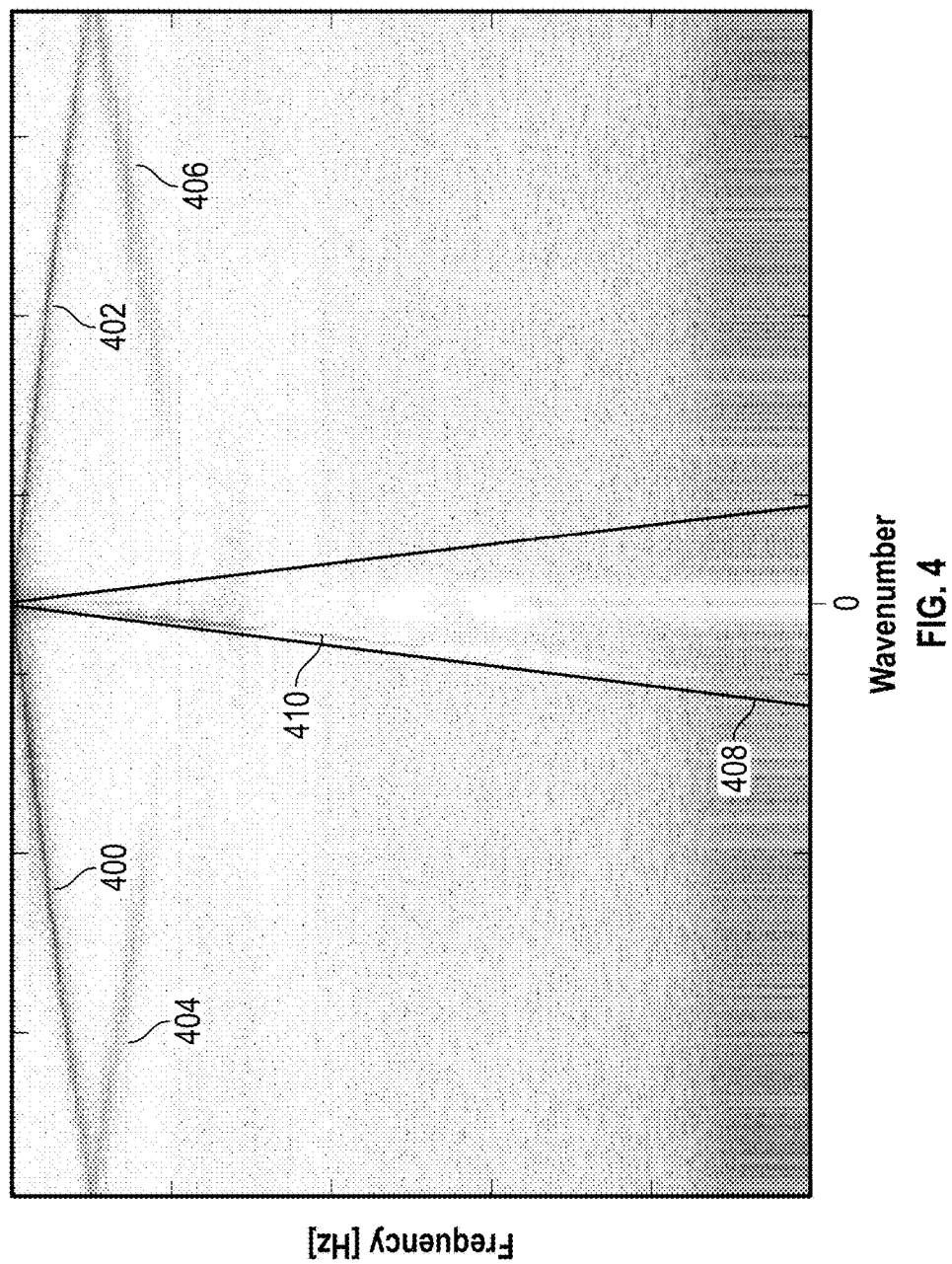
FIG. 4 shows a frequency-wavenumber plot in accordance with at least some embodiments.

FIG. 4 shows a frequency-wavenumber plot of the example data set shown in FIG. 3. That is, FIG. 4 shows the same data set as FIG. 3, but in a different domain. The vertical axis shows frequency of received signals (with zero at the top and frequency increasing downward), and the horizontal axis is wavenumber. Wavenumber refers to spatial frequency of a wave (in this case acoustic energy in the form of either seismic waves or noise). Spatial frequency may be thought of as cycle speed of an acoustic wave. Thus a "slow" wave may complete relatively few full cycles over a unit distance, while a "fast" wave completes many full cycles over the unit distance. Note, however, that the "slow" and "fast" designations refer only to how many cycles of the wave fit within a unit distance, and do not speak to propagation speed of the waves through the water. In FIG. 4 the horizontal axis has a center zero. Wavenumbers to the left of center represent positive wavenumbers (i.e., acoustic waves propagating toward the distal end of the sensor streamer), and wavenumbers to the right of center represent negative wavenumbers (i.e., acoustic waves propagating toward the proximal end of the sensor streamer).

FIG. 4 likewise shows several features of the data in the underlying data set. For example, the features 400 and 402 show lower frequency noise propagating along the sensor streamer toward the distal end and the proximal end, respectively. The slope of the features shows the relative speed of propagation of the noise features 400 and 402 along the sensor streamer (between about 20 and 40 meters per second (m/s)). The example plot also shows additional noise features 404 and 406, but these noise features represent aliasing of the noise features 400 and 402, respectively, caused by the finite spacing between the geophones along the sensor streamer.

Still referring to FIG. 4, signals of interest in the data of a marine geophysical survey with a seismic component are the seismic waves propagating through the water after reflection from formations below the sea floor, and the speed of sound in water is about 1500 m/s. Thus, in most cases the seismic signals in the data corresponding to seismic waves returned from the formations below the seafloor will reside within a signal cone 408 in the frequency-wavenumber domain of FIG. 4. That is, the data that resides within the triangular signal cone 408, such as seismic data 410, represent received signals whose propagation speeds were that of the speed of sound in water and above. However, some of the noise may also actually or appear to (e.g., aliasing) propagate at speeds approaching or exceeding the speed of sound in water, and thus some of the seismic signals of interest may be masked by noise. In the example data set shown in the frequency-wavenumber domain of FIG. 4, the portions of the noise features 400 and 402 near the center of the plot reside within the signal cone 408. Moreover, some of the alias noise features 404 and 406 may appear to be in the signal cone 408.

Related-art processing techniques to reduce noise in the data set involve a technique known as "dip filtering." Dip filtering is a technique that retains data having a combination of propagation velocity and emergence angles considered to cover the useful signals (e.g., data residing within a signal cone representative of propagation velocity of 1500 m/s or more and emergence angles below about 70 degrees), and suppresses or discards the remaining data. Still referring to FIG. 4, conceptually dip filtering is the suppression of all the data that resides outside the signal cone 408 (e.g., the data associated with features 400, 402, 404, and 406).

Referring simultaneously to FIGS. 3 and 4, various embodiments are directed to reducing noise in a data set by a technique that complements the dip filtering of the related art. That is, because the data within the signal cone 408 is band limited in the wavenumber domain, the inventor of the present specification has found it is possible to estimate and suppress noise (e.g., aliased noise) within the signal cone using data from the full data set (e.g., from the frequency-wavenumber domain such as FIG. 4). More precisely then, various embodiments de-propagate noise within a data set using a model of noise propagation along the sensor streamer. Conceptually, the de-propagation "collects" the noise data at the various locations of noise sources. From the de-propagated data, the locations of the noise sources along the sensor streamer when the sensor streamer was within the body of water can be determined, along with an indication of the noise level of each noise source. Stated otherwise, the model of noise propagation along the sensor streamer includes a model of noise source locations along the sensor streamer, and by de-propagation the model of noise source locations is solved such that the locations of noises sources are identified. Once the locations of noise sources along the sensor streamer are identified in the de-propagated data, the example method suppresses data of the de-propagated data set corresponding to noise sources along the sensor streamer. Suppressing data associated with locations of noise sources may be thought of as down-weighting (and in the extreme case removing) the data associated with the spikes 300 and 302 of FIG. 3 (as the data in the spikes, being relatively high frequency, does not propagate far from the noise source) as well as down-weighting noise that propagated away from the locations of the noise sources (e.g., removing much of the high intensity signal below 50 Hz of FIG. 3). Replacement data may be created, such as interpolating the data within the signal cone that may have been down-weighted as part of the suppression of data. The specification now turns to a more mathematical treatment of the noise identification and suppression.

A data set containing velocity data can be written in the frequency-position domain as:

$$d_V(\omega,\chi) = V_z(\omega,\chi) + \upsilon(\omega,\chi) \tag{9}$$

where the terms are as previously defined. In words, the data set containing velocity data is made up of combined vertical velocity response $V_z$ and velocity noise $\upsilon$. Consider now a finite data set of velocity data in the frequency-position domain, from a single sensor streamer, organized as an M×N matrix. Thus, the data set containing velocity data can be written in matrix notation as:

$$D = V_z + N \tag{10}$$

where D is the velocity data in matrix format, $V_z$ is the vertical velocity response in matrix format, N is the noise in matrix format. Each row m in the matrix D (where m=1, 2, ..., M) is frequency, and each column n in the matrix D (where n=1, 2, ..., N) is a sensor position along the sensor streamer. A single frequency slice in the matrix D at $f=f_m$ can thus be represented as:

$$d_m = v_{z,m} + \upsilon_m \tag{11}$$

where $d_m$ is the data at frequency $f_m$, $v_{z,m}$ is the vertical velocity response at frequency $f_m$, and $\upsilon_m$ is the velocity noise at frequency $f_m$.

As previously mentioned, the signal within the signal cone is band-limited in the wavenumber domain and can be created or reconstructed by interpolation from a more sparsely sampled representation. In matrix-vector notation, the ability to create replacement data may be expressed as:

$$v_{z,m} = Q_m \xi_m \tag{12}$$

where $v_{z,m}$ is the reconstructed vertical velocity response data at frequency $f_m$, $Q_m$ is a N×K interpolation matrix, and $\xi_m$ is the more sparsely sampled representation at frequency $f_m$ in the form of a K×1 signal vector. Plugging equation (12) into equation (11) results in:

$$d_m = Q_m \xi_m + \upsilon_m. \tag{13}$$

In words, the data $d_m$ can be considered to be reconstructed vertical velocity response data plus velocity noise. There are many ways to approach deriving the more sparsely sampled representation $\xi_m$. For example, one may impose a linear solution such as:

$$\xi_m^{est} = w_m^{\|} d_m \tag{14}$$

where $\xi_m^{est}$ is the estimated more sparsely sampled representation, $w_m^{\|}$ is a weight vector (where $(\ )^{\|}$ denotes a conjugate transpose for which the expected squared error is reduced or minimized). Another approach to deriving the more sparsely sampled representation $\xi_m$ is to adopt a maximum likelihood approach with Gaussian noise. A third approach is to employ Bayesian method by assigning zero mean Gaussian distribution for the noise term, use a flat prior distribution for the more sparsely sampled representation $\xi_m$, and adopt a symmetric error criterion (e.g., minimized absolute error, squared error, or maximum error).

All three approaches yield the same more sparsely sampled representation $\xi_m^{est}$ as follows:

$$\xi_m^{est} = (Q_m^{\|} R_m^{-1} Q_m)^{-1} Q_m^{\|} R_m^{-1} d_m \tag{15}$$

where $R_m$ is the covariance matrix for the velocity noise $\upsilon_m$ in frequency slice $f_m$. The functions of the factors of equation (15) can be conceptually separated as follows:

$$R_m^{-1} d_m \tag{16}$$

Equation (16) implements the de-propagation of noise along with suppression (e.g., re-weighting) of data in the data set corresponding to locations of noise sources along the sensor streamer after the noise data is "collected" at the locations of the noise sources. That is, the covariance matrix $R_m$ mathematically implements the model of noise propagation along the sensor streamer. Continuing with the remaining portions of equation (15):

$$Q_m^{\|} R_m^{-1} d_m \tag{17}$$

implements dip filtering of the modified data; and $$(Q_m^{\|} R_m^{-1} Q_m)^{-1} Q_m^{\|} R_m^{-1} d_m \tag{18}$$

implements a re-normalization of the dip-filtered reduced data set to ensure that the re-weighting of the portion of equation (16) does not introduce scale errors.

A component in the implementation of the various embodiments is creation of a model of noise propagation with which to create the covariance matrix $R_m$. The model of noise propagation in various embodiments may be based on several elements. First, the model may assume a finite number of noise sources along the sensor streamer, where each noise source has a specific temporal power density. In some cases, each noise source may be considered to be a white noise source, while in other cases each noise source may be considered to have a specific (non-white) temporal power spectral density. Moreover, the sensor streamer is conceptually divided into a plurality segments, for example the segments defined between noise source locations and sensor locations (e.g., between geophones). Each segment has a propagation speed as a function of noise frequency and attenuation as a function of noise frequency. From the model of noise propagation, the covariance matrix $R_m$ can be determined.

More mathematically then, the noise at any location along the sensor streamer can be considered to be from a superposition of noise sources as follows:

$$\upsilon(\omega, \chi) = \sum_{l=1}^{L} \upsilon_l(\omega, \chi) \tag{19}$$

where $\upsilon(\omega, \chi)$ is the velocity noise as a function of the angular frequency $\omega$ and the position along the sensor streamer $\chi$, $\upsilon_l(\omega, \chi)$ is noise contribution from an individual noise source (as a function of angular frequency $\omega$ and position along the sensor streamer l), and L is the total number of noise sources. The noise contribution from an individual noise source is determined by the excitation and propagation parameters as:

$$\upsilon_l(\omega, \chi) = q(\omega, \chi_l) \prod_{i \in N_l} e^{-\gamma i(\omega) \Delta \chi_i} e^{j\omega \frac{\Delta \chi_i}{c_i}} \tag{20}$$

where again $\upsilon_l(\omega, \chi)$ is noise contribution from an individual noise source, $q(\omega, \chi_l)$ is the noise source, $N_l$ is the set of segments between the sensor and noise source $q(\omega, \chi)$ at position $\chi_i$, $\Delta X_i$ is the length of segment i, $\gamma_i(\omega)$ is the frequency dependent attenuation of segment i, and $c_i$ is the propagation speed of segment i. Equation (20) may be equivalently written as:

$$\upsilon_l(\omega, \chi) = q(\omega, \chi_l)e^{\Sigma\left(-\gamma i(\omega) + j\frac{\omega}{c_i}\right)\Delta\chi_i}. \quad (21)$$

Assigning the exponential portion of equation (21) the variable $S_l(\chi)$, equation (21) can thus be summarized as:

$$\upsilon_l(\omega,\chi) = S_l(\chi)q(\omega,\chi_l). \quad (22)$$

Equations (19) through (22) represent a single frequency at a single location. In matrix terms, the velocity noise at a single frequency $f=f_m$ can be expressed as:

$$\upsilon_m = S_m(\gamma,c)q \quad (23)$$

where $\upsilon_m$ is the velocity noise matrix at all positions at frequency $f=f_m$, $S_m$ is a complex-valued propagation in the streamer as function of attenuation $\gamma$ and speed of sound c, and again q is the noise source vector. The covariance matrix $R_m$ may thus be expressed as:

$$R_m = S_m R_q S_m^{\|} \quad (24)$$

where $R_q$ is a matrix containing indications of the strength of the noise sources on its diagonal (e.g., as determined from the de-propagation), and indications of any correlation between the noise sources on the off-diagonal locations. In most cases the noise sources will be uncorrelated, and thus the $R_q$ matrix will be a diagonal matrix.

Figure 5:
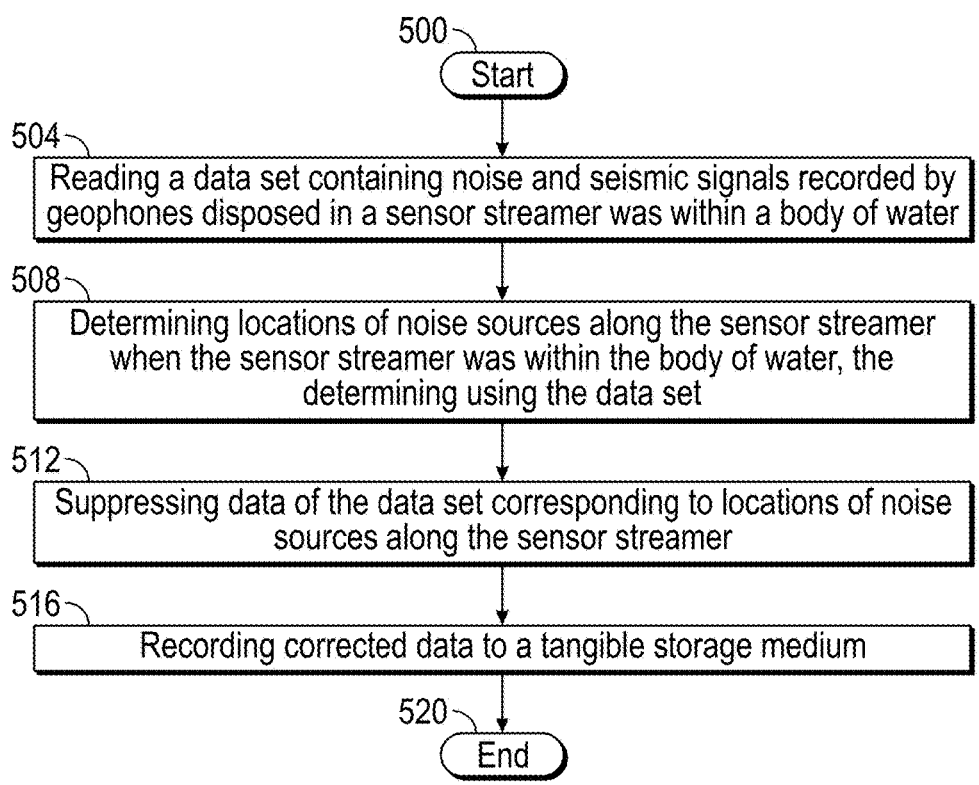
FIG. 5 shows a method in accordance with at least some embodiments.

With that mathematical background, the specification turns to FIG. 5, which is a flow diagram showing a method in accordance with various embodiments, some or all of which may be implemented by a processor of a computer system. In particular, the method starts (500) and proceeds to reading a data set containing noise and seismic signals recorded by geophones disposed in a sensor streamer when the sensor streamer was within a body of water (block 504). The reading of the data set by a computer system may be somewhat contemporaneous with acquiring the data by way of a marine geophysical survey (e.g., by way of a computer system on the survey vessel 102), or the reading may be many days, months, years after the marine geophysical survey is performed (e.g., by a land-based computer system in a data analysis center).

The next step in the example method of FIG. 5 is determining locations of the noise sources along the sensor streamer by de-propagating noise within the data set using the data set and a model of noise propagation along the sensor streamer, along with an indication of the noise level of each noise source (block 508). In reference to the earlier description, the de-propagation may also result in a set of data indicative of amplitude and spectral content at each of the assumed noise source locations. Noise source locations whose amplitude and/or spectral content exceeds predetermined threshold (e.g., spectral content above 100 Hz) thus indicate the locations of the noise sources along the sensor streamer when the sensor streamer was within the body of water. Oppositely, some assumed noise source locations in the model may have amplitude and/or spectral content below a predetermined threshold, and as such the locations associated with the other assumed noise sources are not indicative of noise source locations when the sensor streamer was within the body of water.

Still referring to FIG. 5, the next step in the example method may comprise suppressing data of the data set corresponding to noise sources along the sensor streamer (block 512). Thereafter, the method may comprise recording corrected data on a tangible data storage medium (block 516). In some cases, and again as discussed more mathematically above, the method may include suppressing data that falls outside the signal cone. Thereafter the method ends (block 520). It is noted that the replacement data, being originally based on data recorded by geophones, is thus substantially free of noise caused by noise propagation along the sensor streamer. The replacement data may then be used in further processing, such as calculating the deliverable data in the form of $P_{up}$ data (compensated for surface ghost waves).

In the various embodiments discussed to this point the model of noise propagation (from which the covariance matrix $R_m$ is constructed) may be based on a set of assumptions about: locations of noise sources along the sensor streamer; noise propagation along the sensor streamer based on parameters such as tension; noise propagation as a function of frequency; attenuation of noise along the sensor streamer as a function of frequency; and perhaps even analytical tests on the particular sensor streamer or related sensor streamers. In other embodiments, however, the model of noise propagation in the sensor streamer may be created and/or modified by inducing known vibrations on the sensor streamer while the sensor streamer is towed through the body of water. The data read by geophones of the sensor streamer based on the known vibrations can then be used to create and/or update the model of noise propagation used to remove noise from the data set (which results in a down-sampled data), and from the down-sampled data set the replacement data set may be created as discussed above. The specification now turns to an example sensor streamer to discuss example mechanisms for insertion of the known vibrations (e.g., vibrations above 100 Hz) onto the sensor streamer.

Figure 6:
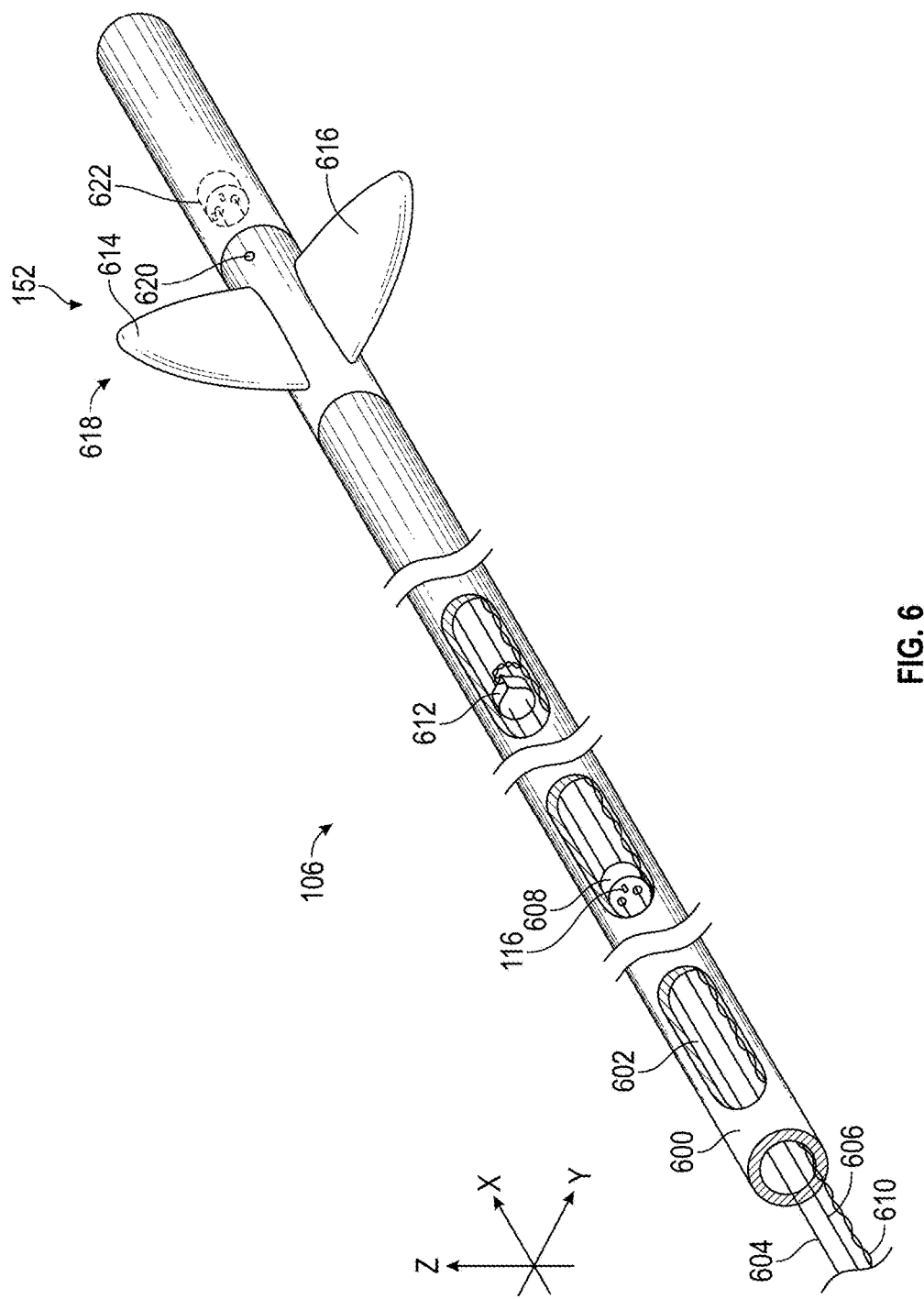
FIG. 6 shows a perspective, partial cut-away view of a sensor streamer in accordance with at least some embodiments.

FIG. 6 shows a perspective, partial cut-away view of a sensor streamer 106 in accordance with example embodiments. In particular, the sensor streamer 106 comprises an outer jacket 600 of flexible and water proof material. The outer jacket 600 thus defines an interior volume 602, which may be filled with a buoyant material (e.g., a gel with specific gravity less than water, or kerosene). Within the outer jacket 600 resides a plurality of lines (e.g., ropes) that act as strength members, and in the example of FIG. 6 two such ropes 604 and 606 are present. In operation, the towing force that moves the sensor streamer 106 through the water is carried by the ropes 604 and 606. Though not specifically shown, sensor streamer 106 may be made of a plurality of sections terminated on each end by metallic couplers. The ropes 602 and 604 are mechanically coupled to the metallic couplers on each end. Towing force is transferred from one sensor streamer section to the next (i.e., transferred from the ropes of one sensor streamer section to the next sensor streamer section) by way of the metallic couplers.

The sensor streamer 106 also comprises a plurality of sensors at spaced locations along the sensor streamer. In some cases, the sensors may be placed at 0.5 meter intervals, but closer and more distance spacing is also contemplated. In the example of FIG. 6 one such sensor 116 is shown, the sensor 116 residing at least in part within a sensor holder 608. As discussed above, the sensor 116 is a collocated hydrophone and geophone, but the hydrophone and geophone are not separately shown so as not to unduly complicate the figure. Also within the outer jacket 600 resides a communication pathway 610 which communicatively couples to the sensor 116 and other sensors along the sensor streamer 106. In some cases, the communication pathway 610 is set of metallic conductors (e.g., one or more pairs of twisted-pair cables), and in other cases the communication pathway 610 may be one or more optical fibers. In yet still other cases, the communication pathway 610 may be a combination of metallic conductors (e.g., carrying power to various devices) and optical fibers (e.g., carrying communication signals).

Still referring to FIG. 6, the example sensor streamer 106 further comprises a source of vibrations disposed at a predetermined location along the sensor streamer 106. The source of vibrations induces the known vibrations on the sensor streamer at the predetermined location while the sensor streamer is towed through water. One example source of vibrations is shown in FIG. 6 as source of vibrations 612 disposed at a predetermined location with respect to and within outer jacket 600. The example source of vibrations 612 is communicatively coupled to the communication pathway 610, and the example source of vibrations 612 selectively induces known vibrations onto the sensor streamer 106 based on commands received through the communication pathway 610. The example source of vibrations 612 is shown to be mechanically coupled to the ropes 604 and 606, and also mechanically coupled to the outer jacket 600, such that the known vibrations are induced in both the ropes and the outer jacket; however, in other cases the mechanical coupling to the outer jacket 600 may be omitted so that the known vibrations are induced only or predominantly in the ropes 604 and 606, and in yet still other cases the mechanical coupling to the ropes 604 and 606 may be omitted so that the known vibrations are induced only or predominantly in the outer jacket 600. Specific examples of the structure of the source of vibrations 612 are discussed more below.

The example source of vibrations 612 may be designed and constructed to induce the known vibrations having an orientation perpendicular to a plane defined by the two ropes 604 and 606 at the location of the source of vibrations 612 (e.g., in the Z direction of the coordinate system shown). Twisting of the sensor streamer 106 is possible, and thus the plane may be defined by the ropes 604 and 606 over a short distance before and after the location of the source of vibrations 612 (e.g., a 10 centimeter section with the source of vibrations disposed in the middle thereof). In other cases, the source of vibrations 612 may be designed and constructed to induce the known vibrations having an orientation parallel to the ropes at the location of the source of vibrations 612 (e.g., in the X-Y plane of the coordinate system shown). Again, considering possible twisting of the sensor streamer 106, the plane may be defined by the ropes 604 and 606 over a short distance before and after the location of the source of vibrations 612. In yet further still cases, the source of vibrations may selectively induce the known vibration in both directions. The specification now turns to example systems to implement the source of vibrations 612.

Figure 7:
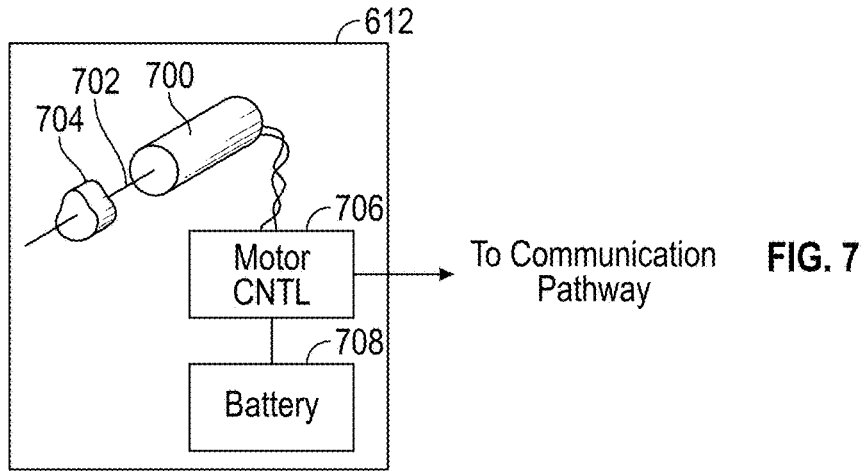
FIG. 7 shows a source of vibrations in accordance with at least some embodiments.

FIG. 7 shows, in partial block diagram form, an example source of vibrations 612. In particular, the source of vibrations 612 of FIG. 7 comprises an electric motor 700 that defines a rotatable shaft 702. Coupled to the rotatable shaft is an eccentric weight 704. The eccentric weight has a center of mass that does not correspond to the location where the rotatable shaft 702 couples to the eccentric weight. In this way, as the electric motor 700 turns the rotatable shaft, the eccentric weight produces mechanical vibrations related to the speed of rotation of the rotatable shaft 702. The electric motor 700 electrically couples to a motor control circuit 706, and the motor control circuit 706 also communicatively couples to the communication pathway 610 (FIG. 6). The motor control circuit 706 selectively activates the electric motor 700 to create known vibrations for the purpose of creating and/or adjusting the model of noise propagation along the sensor streamer. The electric motor 700 may take any suitable form, such as a direct current (DC) motor, an alternating current (AC) motor, a stepper motor, and the like. Correspondingly, the motor control circuit 706 is designed and constructed to operate the specific type of electric motor 700, based on commands received over the communication pathway 610 (FIG. 6). In the example system, power to operate the electric motor 700 and the motor control circuit 706 is drawn from a local battery 708, but in other cases power to operate the various devices may be supplied across the communication pathway 610 (FIG. 6).

Figure 8:
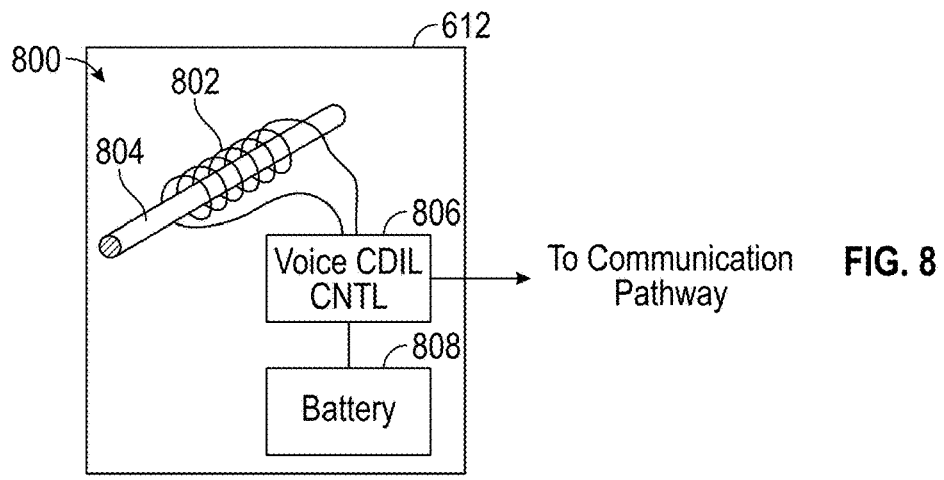
FIG. 8 shows a source of vibrations in accordance with at least some embodiments.

FIG. 8 shows, in partial block diagram form, another example source of vibrations 612. In particular, the source of vibrations 612 of FIG. 8 comprises a voice coil 800 that includes a winding or solenoid 802 and a plunger 804. When the solenoid 802 is energized, the plunger 804 resides (at least partially) within magnetic flux paths created by the solenoid (the magnetic flux paths not shown so as not to unduly complicate the figure). In some cases, the solenoid is fixed relative to the outer jacket of the sensor streamer, and the plunger 804 moves within the magnetic flux path (e.g., fixed coil audio speaker). In other cases, the plunger 804 is fixed relative to the outer jacket of the sensor streamer, and the solenoid 802 moves within the magnetic flux path (e.g., a moving coil audio speaker). Regardless, the relative movement of the plunger 804 and the solenoid 802 produces mechanical vibrations related to the frequency of a driving electrical signal applied to the solenoid. The voice coil 800 electrically couples to a voice coil control circuit 806, and the voice coil control circuit 806 also communicatively couples to the communication pathway 610 (FIG. 6). The voice coil control circuit 806 selectively activates the voice coil 800 to create known vibrations for the purpose of creating and/or adjusting the model of noise propagation along the sensor streamer. In the example system, power to operate the voice coil 800 and the voice coil control circuit 806 is drawn from a local battery 808, but in other cases power to operate the various devices may be supplied across the communication pathway 610 (FIG. 6).

Figure 9:
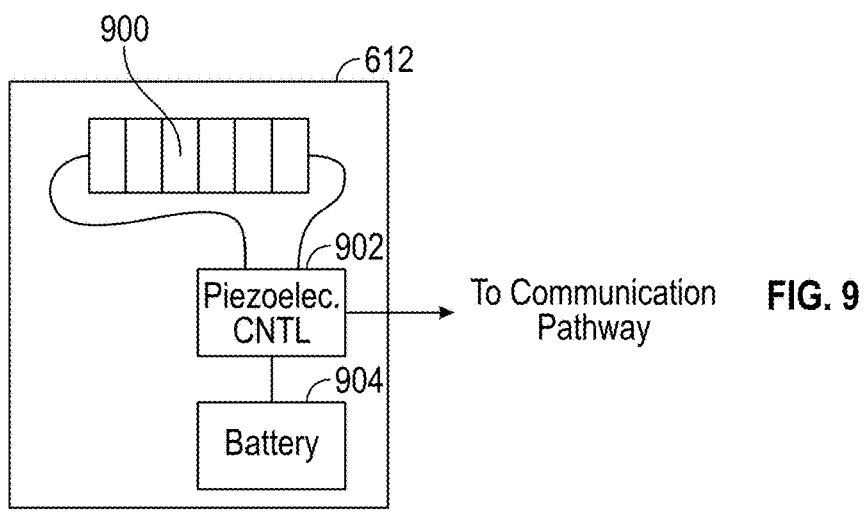
FIG. 9 shows a source of vibrations in accordance with at least some embodiments.

FIG. 9 shows, in partial block diagram form, another example source of vibrations 612. In particular, the source of vibrations 612 of FIG. 9 comprises a stack of piezoelectric elements 900. Piezoelectric elements have the property that, when exposed to an electric field, the elements deform. When the electric field is removed the elements return to their original shape. Using this physical phenomenon, known vibrations can be created by applying an AC electric field to the piezoelectric elements 900. The piezoelectric elements 900 electrically couple to a piezoelectric control circuit 902, and the piezoelectric control circuit 902 also communicatively couples to the communication pathway 610 (FIG. 6). The piezoelectric control circuit 902 selectively activates the piezoelectric stack 900 to create known vibrations for the purpose of creating and/or adjusting the model of noise propagation along the sensor streamer. In the example system, power to operate the piezoelectric stack 900 and the piezoelectric control circuit 902 is drawn from a local battery 904, but in other cases power to operate the various devices may be supplied across the communication pathway 610 (FIG. 6).

The example sources of vibrations 612 of FIGS. 7, 8, and 9 each have a single vibrational element creating the known vibrations. The orientation of the single element may define whether the vibrations are created perpendicular to the plane defined by the two ropes 604 and 606 (FIG. 6, and e.g., in the Z direction of the coordinate system of FIG. 6) or parallel to the ropes (e.g., in the X-Y plane of the coordinate system of FIG. 6). For example, if the plunger 804 of FIG. 8 oscillates within the plane defined by the ropes at the location of the source of vibrations 612, then the known vibrations will be induced in the plane. Likewise, if the plunger 804 of FIG. 8 oscillates perpendicular to the plane defined by the ropes at the location of the source of vibrations 612, then the known vibrations will be induced perpendicular to the plane. Similarly for the piezoelectric stack 900 in relation to the direction of expansion and contraction based on applied electric fields. The orientation of the vibrations created by the eccentric weight depend on the orientation of the rotatable shaft 702, but also on the direction of the force of gravity (which may change based on twisting of the sensor streamer), but similar ideas apply.

Moreover, if known vibrations are desired both parallel and perpendicular to the plane of the ropes, or selectively induced either parallel or perpendicular to the plane, then the vibrational elements within each source of vibration can be duplicated. For example, referring to the embodiments of FIG. 8, a first plunger (and associated solenoid) can be placed within the plane of the ropes, and a second plunger (and associated solenoid) can be placed perpendicular to the plane of the ropes, and each solenoid can be selectively activated.

The timing for inducing the known vibrations onto the sensor streamer may likewise take many forms. In some example embodiments the known vibrations are induced during a period of time after a shot, but before the first returns of seismic waves from the seafloor and/or formations below the seafloor. In this way, the model of noise propagation along the sensor streamer may be created and/or updated based on the state of the sensor streamer just moments before the seismic signals are recorded. In other cases, the known vibrations are induced during a period of time after the last return of waves signal from a first shot, but prior to an immediately subsequent shot. Thus, the model of noise propagation along the streamer may be created and/or updated based on the state of the sensor streamer just after the seismic signals are recorded. It may also be created prior to the commencement of the survey.

In yet still other cases, the known vibrations may be induced during periods of time when the seismic waves from the shot are impinging on the sensors of the sensor streamer, and thus the known vibrations overlap in time with the seismic signals. In some of these overlap cases, the frequency of the known vibrations may be selected or adjusted to be outside a band of frequencies of interest of the seismic signals. In yet still other cases when the known vibrations are induced during periods of time when the seismic waves are impinging on the sensors of the sensor streamer, the known vibrations may the form of an encoded signal which can be separated from the seismic signal (e.g., spread-spectrum encoded signals like code division multiple access).

In yet still other cases, the inducing of the known vibrations may take place in the relation to sail lines. A sail line is a straight path of travel of the survey vessel in the body of water, the path of travel in relation to an underground formation of interest. In many cases the path of travel will be directly above the underground formation of interest, but not in all cases. Regardless, the survey vessel sails along a first sail line for predetermined distance making many shots and collecting data for each shot. The survey vessel then makes a 180 degree directional turn to sail along a second sail line, where the second sail line is parallel to but offset from the first sail line. Inducing the known vibrations then may involve inducing at the beginning of a sail line prior to the first shot along the sail line. In other cases, inducing the known vibrations may involve inducing at the end of a sail line after return of seismic waves from the last shot of the sail line.

Returning to FIG. 6, the source of vibrations 612 is a source whose primary function is creation of the known vibrations; however, in other cases the source of vibrations may serve a dual purpose. Still referring to FIG. 6, the example sensor streamer 106 also comprises a streamer positioning device 152. As previously mentioned, the streamer positioning device 152 may assist in maintaining depth of the sensor streamer 106, and also lateral positioning of the sensor streamer 106. To accomplish the depth and lateral position control, the streamer positioning device 152 may comprise a plurality of wings. For streamer positioning devices that control depth and lateral position, three wings may be used, and in the view of FIG. 6 two wings 614 and 616 are visible, with the third wing hidden by the sensor streamer 106. The discussion that follows is equally applicable to streamer positioning devices that only control depth and have only two wings (such as streamer positioning devices 150 discussed with respect to FIG. 1).

As alluded to in reference to FIG. 2, streamer positioning devices create noise, and thus in further example embodiments the streamer positioning devices, such as streamer positioning device 152, are used as a source of vibrations 618 for creating and/or modifying the model of noise propagation along the sensor streamer. In particular, the noise created by a streamer positioning device is dependent upon the speed of the movement of the sensor streamer 106 through the water, and also on the deflection of the wings (e.g., 614 and 616) to maintain depth and lateral position. A priori, the position of each streamer positioning device is known, and thus the noise associated with the streamer positioning device can be used to create and/or update the model of noise propagation.

While in some cases knowing just the locations of the streamer positioning device provides sufficient information with which to create and/or update the model of noise propagation, in yet still other cases the nature of the noise (e.g., spectral information, amplitude) may also be used for better refinement of the model of noise propagation. Because the nature of the noise created by a streamer positioning device changes over time (e.g., as the deflection of the wings takes place), in yet still further embodiments the noise created by the streamer positioning device is measured proximate to the streamer positioning device. In some cases, a dedicated geophone may be placed on or near the streamer positioning device, such as geophone 620. Thus, given the known location of the streamer positioning device 152, and the known amplitude and spectral content of the noise as measured by the geophone 620, the model of the noise propagation may be created and/or updated. In yet still other cases, rather than using a dedicated geophone, the closest geophone of a sensor 116 may be used to read the amplitude and spectral content of the noise created by the streamer positioning device 152. In the example case of FIG. 6, a sensor 622 closest to the streamer positioning device (and more particularly the geophone of the sensor 622) may be used to measure the amplitude and spectral content of the noise created by the streamer positioning device 152. Of course, in the case of the streamer positioning device 152 as a source of vibrations 618, the primary function of the streamer positioning device 152 is positioning, with the secondary function being the creation of the known vibrations with which to create and/or modify the model of noise propagation along the sensor streamer 106.

Figure 10:
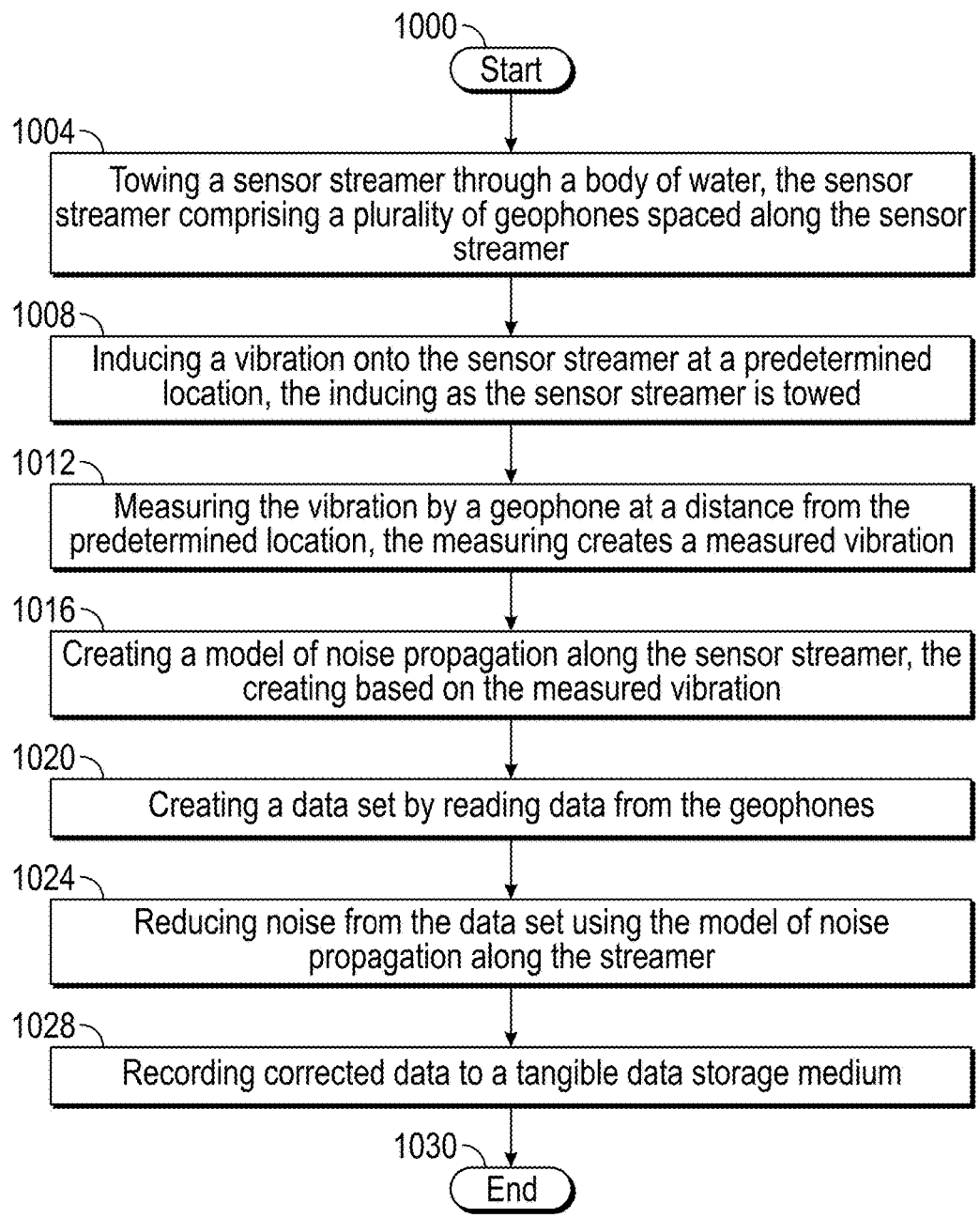
FIG. 10 shows a method in accordance with at least some embodiments.

FIG. 10 shows, in block diagram form, a method in accordance with example embodiments, some of which may be performed using a computer system. In particular, the method starts (block 1000) and comprises: towing a sensor streamer through a body of water, the sensor streamer comprising a plurality of geophones spaced along the sensor streamer (block 1004); inducing a vibration onto the sensor streamer at a predetermined location, the inducing as the sensor streamer is towed (block 1008); measuring the vibration by a geophone at a distance from the predetermined location, the measuring creates a measured vibration (block 1012); creating a model of noise propagation along the sensor streamer, the creating based on the measured vibration (block 1016); creating a data set by reading data from the geophones (block 1020); reducing noise from the data set using the model of noise propagation along the streamer (block 1024); and recording corrected data to a tangible data storage medium (1028). Thereafter, the method ends (block 1030).

Figure 11:
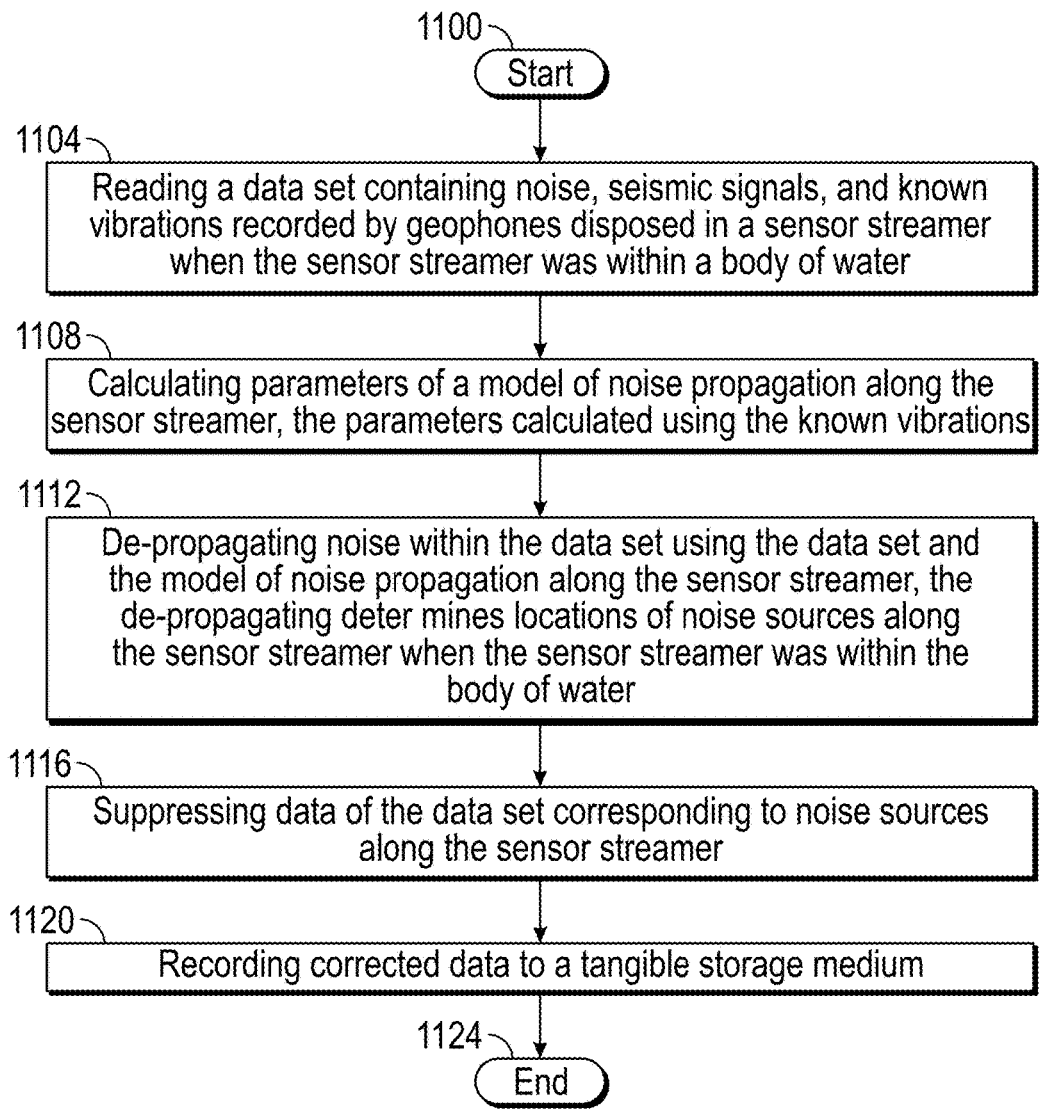
FIG. 11 shows a method in accordance with at least some embodiments.

FIG. 11 shows, in block diagram form, a computer-implemented method in accordance with example embodiments. In particular, the method starts (block 1100) and comprises: reading a data set containing noise, seismic signals, and known vibrations recorded by geophones disposed in a sensor streamer when the sensor streamer was within a body of water (block 1104); calculating parameters of a model of noise propagation along the sensor streamer, the parameters calculated using the known vibrations (block 1108); de-propagating noise within the data set using the data set and the model of noise propagation along the sensor streamer, the de-propagating determines locations of noise sources along the sensor streamer when the sensor streamer was within the body of water (block 1112); suppressing data of the data set corresponding to noise sources along the sensor streamer (block 1116); and recording corrected data to a tangible data storage medium (block 1120). Thereafter, the method ends (block 1124).

Figure 12:
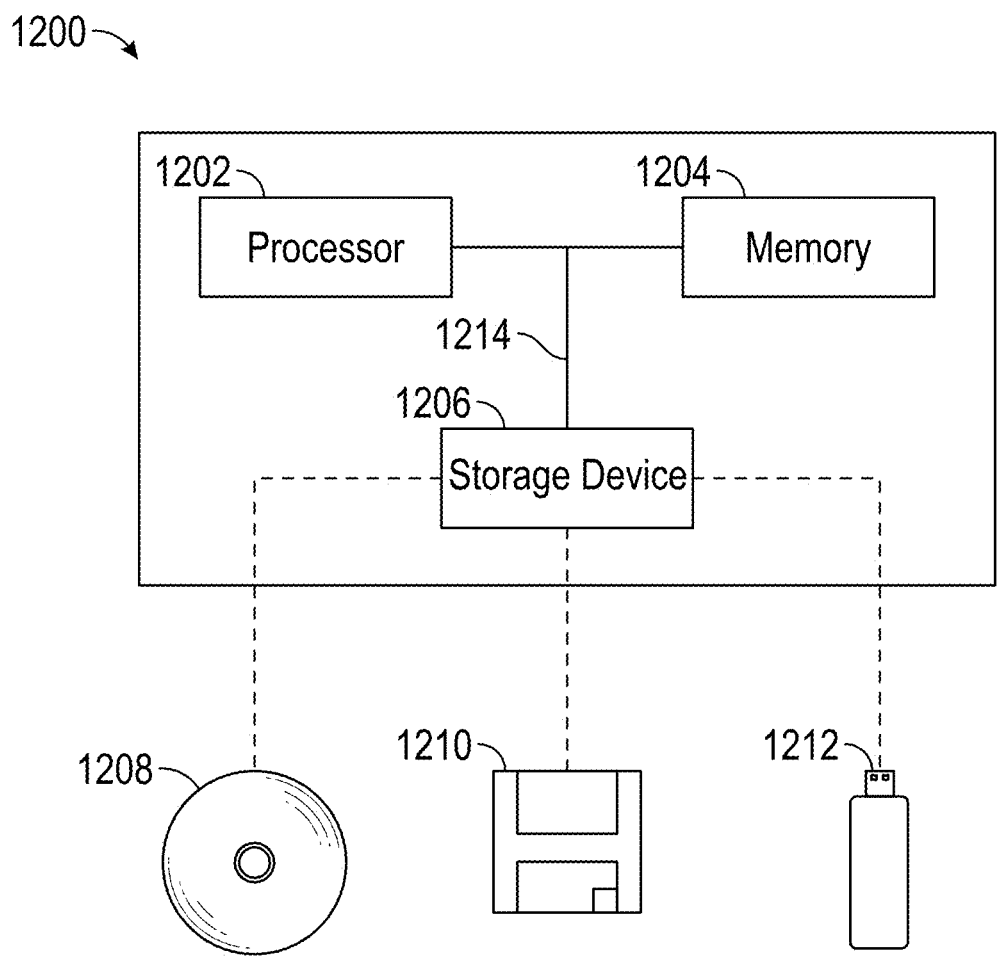
FIG. 12 shows a computer system in accordance with at least some embodiments.

FIG. 12 shows a computer system 1200 in accordance with at least some embodiments. The computer system 1200 is an example of: a computer system upon which portions of the example methods discussed could be performed; a computer system that forms a part or all of the systems described; or a computer system that creates the geophysical data product. The example computer system 1200 comprises a processor 1202 coupled to a memory 1204 and a storage system or long term storage device 1206. The processor 1202 may be any currently available or after-developed processor, or group of processors. The memory 1204 may be random access memory (RAM) which forms the working memory for the processor 1202. In some cases, data and programs may be copied from the storage device 1206 to the memory 1204 as part of the operation of the computer system 1200.

The long term storage device 1206 is a device or devices that implement non-volatile long-term storage, which may also be referred to as a non-transitory computer-readable media. In some cases, the long term storage device is a hard drive or solid state drive, but other examples include optical discs 1208, "floppy" disks 1210, and flash memory devices 1212. The various programs used to implement the programmatic aspects may thus be stored on the long term storage device 1206, and executed by the processor 1202. Relatedly, the noise reduction of the various embodiments may be calculated by the processor 1202 and communicated to the storage device 1206 (including the example optical disc 1208, floppy disk 1210, or flash memory device 1212) by way of a telemetry channel 1214 to become a geophysical data product.

In accordance with a number of embodiments of the present disclosure, a geophysical data product may be produced. The geophysical data product may include, for example, data where the noise has been de-propagated and suppressed. Geophysical data, such as data previously collected by sensors, may be obtained (e.g., retrieved from a data library) and may be stored on a non-transitory, tangible computer-readable medium. The geophysical data product may be produced by processing the geophysical data offshore (i.e., by equipment on a vessel) or onshore (i.e., at a facility on land). In some instances, once onshore, geophysical analysis, including further data processing, may be performed on the geophysical data product. In some instances, geophysical analysis may be performed on the geophysical data product offshore. For example, the de-propagation of noise using the model and suppressing data associated with noise sources, may be performed on a vessel at sea.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, each sensor streamer 106 may comprise multiple individual sections electrically and mechanically coupled end-to-end to form each overall streamer 106. It is intended that the following claims be interpreted to embrace all such variations and modifications.

What is claimed is:

1. A computer-implemented method of processing seismic data to reduce noise, the method comprising:
    reading, by a computer system, an original data set recorded by geophones disposed within an outer jacket of a sensor streamer when the sensor streamer was within a body of water, the original data set containing seismic signals and noise from actual noise sources outside and coupled to the outer jacket;
    de-propagating noise within the original data set using the original data set and a model of noise propagation along the sensor streamer, the de-propagating to determine locations of noise sources along the sensor streamer when the sensor streamer was within the body of water, the de-propagating comprising:
        modelling a plurality of noise sources along the model of noise propagation along the sensor streamer, the modelling creating a model of noise source locations; and
        identifying locations of actual noise sources outside the outer jacket and along the sensor streamer by solving the model of noise source locations and the model of noise propagation;
    suppressing, by the computer system, data of the original data set corresponding to actual noise sources along the sensor streamer; and thereby creating a replacement data set having reduced noise compared to the original data set.

2. The method of claim 1 wherein modelling the plurality of noise sources further comprises modelling each noise source as a white noise source.

3. The method of claim 1 wherein modelling further comprises using the model of noise propagation that defines a plurality of segments between geophones, where each segment has a propagation speed as a function of noise frequency and an attenuation as a function of noise frequency.

4. The method of claim 1 further comprising suppressing data that falls outside a signal cone.

5. The method of claim 1 wherein de-propagating further comprises determining data indicative of amplitude of noise sources along the sensor streamer when the sensor streamer was within the body of water.

6. The method of claim 1 wherein de-propagating noise within the data set further comprises determining locations of the noise sources based on amplitude of data within the data set having frequencies above 100 Hz.

7. A system comprising:
a processor;
a memory coupled to the processor; and
wherein the memory stores a program that, when executed by the processor, causes the processor to:
read an original data set recorded by geophones disposed within an outer jacket of a sensor streamer when the sensor streamer was within a body of water, the original data set containing seismic signals and noise from actual noise sources outside the outer jacket;
de-propagate noise within the data set using the original data set and a model of noise propagation along the sensor streamer by causing the processor to:
model a plurality of noise sources along the model of noise propagation along the sensor streamer, the modelling creates a model of noise source locations; and
identify locations of actual noise sources outside the outer jacket and along the sensor streamer by solving the model of noise source locations and the model of noise propagation;
suppress data of the original data set corresponding to actual noise sources along the sensor streamer, and thereby creating a replacement data set that has reduced noise compared to the original data set.

8. The system of claim 7 wherein when the processor models the plurality of noise sources, the program causes the processor to model each noise source as a white noise source.

9. The system of claim 7 wherein when the processor models a plurality of noise sources, the program causes the processor to use the model of noise propagation that defines a plurality of segments between geophones, where each segment has a propagation speed as a function of noise frequency and an attenuation as a function of noise frequency.

10. The system of claim 7 wherein when the processor suppresses data, the program causes the processor to suppress data that falls outside a signal cone.

11. The system of claim 7 wherein when the processor de-propagates, the program causes the processor to determine data indicative of amplitude of noise sources along the sensor streamer when the sensor streamer was within a body of water.

12. The system of claim 7 wherein when the processor de-propagates noise within the data set, the program causes the processor to determine locations of the noise sources based on amplitude of data within the data set having frequencies above 100 Hz.

13. A method of generating a geophysical data product comprising:
obtaining geophysical data recorded by geophones disposed within an outer jacket of a sensor streamer when the sensor streamer was within a body of water, the geophysical data containing seismic signals and noise from actual noise sources disposed outside the outer jacket;
modelling a plurality of noise sources along a model of noise propagation along the sensor streamer, the modelling creating a model of noise source locations;
identifying locations of actual noise sources along the sensor streamer by solving the model of noise source locations and the model of noise propagation;
suppressing data within the geophysical data corresponding to actual noise sources along the sensor streamer, thereby creating modified data that has reduced noise compared to the geophysical data; and
recording the modified data in a tangible data storage medium.

14. The method of claim 13 wherein modelling further comprises using the model of noise propagation that defines a plurality of segments between geophones, where each segment has a propagation speed as a function of noise frequency and an attenuation as a function of noise frequency.

15. A computer-implemented method of reducing noise in seismic data comprising:
reading, by a computer system, an original data set containing noise and seismic signals recorded by geophones disposed in a sensor streamer when the sensor streamer was within a body of water;
determining, by the computer system, location of actual noise sources associated with the sensor streamer when the sensor streamer was within the body of water by:
creating a model of noise propagation along the sensor streamer;
creating a model of noise sources along the sensor streamer, the model of noise sources having a plurality of assumed noise sources spaced along the sensor streamer;
solving the model of noise propagation and the model of noise sources to create a model solution using the original data set;
identifying locations of actual noise sources along the sensor streamer using the model solution;
suppressing, by the computer system, data corresponding to the actual noise sources along the sensor streamer; and thereby
creating a replacement data set having reduced noise compared to the original data set.

16. The computer-implemented method of claim 15 wherein creating the model of noise propagation further comprises creating the model of noise propagation that defines a plurality of segments between geophones, where each segment has a propagation speed as a function of noise frequency and an attenuation as a function of noise frequency.

17. The computer-implemented method of claim 15 wherein identifying locations of actual noise sources further comprises:

identifying assumed noise sources of the plurality of noise sources as actual noise sources if the assumed noise sources have an amplitude above a predetermined threshold or a spectral content above a predetermined threshold; and
refraining from identifying assumed noise sources of the plurality of assumed noise sources as actual noise sources if the assumed noise sources have an amplitude below a predetermined threshold or a spectral content below a predetermined threshold.

* * * * *